United States Patent
Hager et al.

(10) Patent No.: US 6,855,742 B2
(45) Date of Patent: Feb. 15, 2005

(54) AGENTS FOR REDUCING THE FORCE-TO-CRUSH (FTC) OF HIGH SUPPORT FLEXIBLE FOAMS

(75) Inventors: Stanley L. Hager, Cross Lanes, WV (US); Utpal C. Adhikari, Cross Lanes, WV (US)

(73) Assignee: Bayer Antwerp, N.V., Antwerp (BE)

( * ) Notice: Subject to any disclaimer, the term of this patent is extended or adjusted under 35 U.S.C. 154(b) by 87 days.

(21) Appl. No.: 10/352,614

(22) Filed: Jan. 28, 2003

(65) Prior Publication Data

US 2004/0147627 A1 Jul. 29, 2004

(51) Int. Cl.$^7$ .............................................. C08G 18/28
(52) U.S. Cl. ...................... 521/130; 521/131; 521/137; 521/170; 521/174
(58) Field of Search ............................. 521/130, 131, 521/137, 170, 174

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 3,652,639 A | 3/1972 | Pizzini et al. |
| 3,823,101 A | 7/1974 | Eiland |
| RE28,715 E | 2/1976 | Stamberger |
| RE29,118 E | 1/1977 | Stamberger |
| 4,089,835 A | 5/1978 | König et al. |
| 4,104,236 A | 8/1978 | Simroth |
| 4,111,865 A | 9/1978 | Seefried, Jr. et al. ....... 521/137 |
| 4,119,586 A | 10/1978 | Shah .......................... 521/137 |
| 4,125,505 A | 11/1978 | Critchfield et al. |
| 4,148,840 A | 4/1979 | Shah |
| 4,172,825 A | 10/1979 | Shook et al. |
| 4,260,530 A | 4/1981 | Reischl et al. |
| 4,524,157 A | 6/1985 | Stamberger ................. 521/156 |
| 4,579,700 A | 4/1986 | Cavender .................. 264/46.4 |
| 4,690,956 A | 9/1987 | Ramlow et al. ............. 521/137 |
| 5,011,908 A | 4/1991 | Hager ......................... 528/392 |
| 5,079,270 A | 1/1992 | Burkhart et al. ............. 521/117 |
| 5,158,922 A | 10/1992 | Hinney et al. .............. 502/175 |
| 5,171,759 A | 12/1992 | Hager ......................... 521/174 |
| 5,470,813 A | 11/1995 | Le-Khac ..................... 502/175 |
| 5,605,939 A | 2/1997 | Hager ......................... 521/137 |
| 5,614,566 A | 3/1997 | Burkhart et al. ............. 521/132 |
| 5,677,361 A | * 10/1997 | Treboux et al. ............. 521/137 |
| 5,690,855 A | 11/1997 | Nichols et al. ........ 252/182.27 |
| 6,031,013 A | 2/2000 | Scherzer et al. ............. 521/174 |
| 6,034,197 A | 3/2000 | Mahon et al. ............... 527/174 |
| 6,136,876 A | 10/2000 | Meier et al. ................. 521/112 |

FOREIGN PATENT DOCUMENTS

| | | |
|---|---|---|
| JP | 50-149794 | 12/1975 |
| JP | 5-255467 | 10/1993 |

* cited by examiner

*Primary Examiner*—John M. Cooney, Jr.
(74) *Attorney, Agent, or Firm*—Joseph C. Gil; John E. Mrozinski, Jr.

(57) ABSTRACT

The present invention provides a high support (HS) and high support-high resilience (HS-HR) flexible polyurethane foams prepared by catalyzed reaction of one or more di- or polyisocyanates at an isocyanate index from about 70 to about 130 with:

(a) a polyoxyalkylene polyol or polyoxyalkylene polyol blend having an average hydroxyl weight of at least about 1000 and an average primary hydroxyl content of at least about 25%; and (b) an effective amount of a blowing agent containing water;

in the presence of from about 0.01 to about 0.5% parts by weight based on 100 parts by weight of said polyol component of a liquid hydrocarbon containing greater than 50% of polymerized butadiene. The high support (HS) and high support-high resilience (HS-HR) flexible polyurethane foams of the present invention have a reduced force to crush (FTC).

40 Claims, No Drawings

AGENTS FOR REDUCING THE FORCE-TO-CRUSH (FTC) OF HIGH SUPPORT FLEXIBLE FOAMS

FIELD OF THE INVENTION

The present invention relates in general to high support (HS) and high support-high resilience (HS-HR) flexible foams having urethane groups, and more particularly, to a method for producing HS and HS-HR polyurethane foams having a reduced force required to crush (FTC). The HS and HS-HR foams of the present invention contain a low level of a liquid hydrocarbon containing polymerized butadiene.

BACKGROUND OF THE INVENTION

Flexible polyurethane foams are well recognized articles of commerce. The two most common classifications of flexible polyurethane foams have been conventional and high resilience (HR) as set forth in ASTM D3770; now discontinued. ASTM D 3453-01 currently sets forth specifications for three cushioning grades of flexible urethane cellular materials, which include normal support (NS), high support (HS) and high support-high resilience (HS-HR). The latter designation encompasses the former HR classification. Flexible foams may also be characterized by the process used in production thereof, either molded or free-rise. Free-rise foams are often made in a continuous slabstock process. Molded foams are typically manufactured within an enclosed chamber having the shape of the desired finished article. HS and HS-HR foams are manufactured by both free-rise and molded processes.

HS and HS-HR foams are widely employed in furniture, mattresses, automotive and numerous other applications. HS and HS-HR foams are differentiated from conventional foams by their higher support factor. HS-HR foams are also distinguished by their higher resilience. As set forth in ASTM Standard Specification D 3453-01, HS foams have a minimum support factor of 2.3 whereas HS-HR foams have a minimum support factor of 2.4 and a minimum resilience of 55%. Support factor is the ratio of 65% IFD to 25% IFD and resilience is the Ball Rebound percentage. Measurement specifications for 25% IFD, 65% IFD and Ball Rebound are set forth in ASTM D 3574-01.

In such foams, a high crosslinking density is achieved during foaming through the use of more reactive polyols and typically through the use of a crosslinking agent such as diethanolamine, triethanolamine, glycerine, sorbitol and the like. Higher functionality isocyanates such as polymeric MDI may also be employed in addition to, or instead of, the crosslinking agents. The enhanced crosslinking provides stabilization to the rising foam and obviates the need for a strongly stabilizing silicone surfactant as used in the production of Normal Support (NS) foams. Use of a weak silicone or no silicone surfactant contributes to the formation of foams with higher support factor. However, it is inherent in these foam types that most cell windows remain fully or partially intact at the time of production, thus necessitating a crushing process to enhance the air flow and to achieve the cushioning and property requirements of the end-use application. For very reactive systems, such as those encountered in molded automotive seating, the foams may exhibit a predominantly closed cell structure that requires immediate hot crushing to avoid shrinkage or warpage of the part. Free-rise foams produced by a continuous slabstock process generally do not contain a significant percentage of fully closed cells, and in most cases, need not be crushed until after cooling. Molded and free-rise flexible HS and HS-HR foams made with poly(oxyalkylene) polyols that are polymerized with a double metal cyanide (DMC) alkoxylation catalyst have been found to exhibit increased tightness (U.S. Pat. No. 5,605,939) and can be particularly difficult to crush open.

Processing latitude means the tolerance limits within which it is possible to deviate from a formulation and still maintain commercially acceptable processing and foam property requirements. These limits are typically set on the one end by factors such as poor foam cure, long demold time, instability, and voids, whereas the other end is indicated by foam shrinkage, warpage and inability to crush the foam sufficiently open to achieve good cushioning performance.

Current mechanical methods for cell opening and porosity enhancement of molded foams typically involve compressive crushing, vacuum rupture or time pressure release. Compressive crushing can be accomplished by removing the part from the mold and immediately compressing by hand or between plates, or more commonly by passing through rollers.

Vacuum crushing involves drawing a vacuum on the finished foam causing cell rupture. A commercially attractive method for cell opening is time pressure release (TPR), which requires opening the mold during the curing process to release the internal pressure and reclosing for the duration of the cure time. The sudden release of the internally generated pressure bursts the cell windows, thereby producing a sufficiently open cell foam to avoid shrinkage or warpage (U.S. Pat. Nos. 6,136,876 and 4,579,700). TPR may be supplemented by a later mechanical crushing step to more fully open the cell windows and achieve high air flow.

Free-rise HS and HS-HR foams can be crushed hot if necessary, but more commonly are crushed after cooling because those foams are generally produced without a significant closed cell content and thus are not subject to high shrinkage or warpage during cooling. However, air flow is usually very low until the foams undergo a mechanical crushing process. This often involves passing the large slabstock bun through a multi-stage roller crusher that compresses the bun by progressively larger amounts. Compression by at least 75% (25% of original height) and preferably 90% is generally done to approach the fully crushed air flow. Another approach is to cut the bun into smaller slabs or into the end-use part dimensions and crush these separately. In some cases where the foam is easily crushed, a separate crushing process may be avoided if the foam is opened sufficiently by flexing during the fabrication process or in the end-use application.

Foam crushing can cause a number of problems in the production of molded and free-rise HS and HS-HR foams. Excessively high crushing forces can result in non-useable foam in the intended application if it is not possible to sufficiently open the foam or if the crushing process permanently distorts the part or tears the foam. In the TPR process, there can be a very narrow time window between the time that the foam is insufficiently reacted to open the mold and the time that it is too tight to crush by this process. Foams that do not crush well can result in poor cushioning characteristics, and poor durability due to excessive softening and increased tendencies to take a permanent set. Accordingly, chemical agents to avoid high crushing forces and improve the crushability of HS and HS-HR foams would be welcomed.

U.S. Pat. No. 6,136,876 discloses a polyurethane flexible foam containing an organic polyisocyanate and a polyol in the presence of a catalyst composition, a blowing agent, optionally a silicone surfactant cell stabilizer and an active methylene- or methine (methylidyne) group containing compound which is used as a cell opening agent. The cell opening agents are characterized as weak Brønsted acids. A disadvantage of the approach of the '876 patent is that the weak acids tend to reduce the reactivity of the isocyanate with the active hydrogen components. To compensate, it is often necessary to increase catalyst levels, thereby increasing costs and potentially leading to higher crushing forces. In addition, these cell opening agents may not be chemically stable if blended with other "B" side components as is commonly practiced in molded foam processing. Many HS and HS-HR grades of slabstock and molded foams have very high FTC (Force Required to Crush) values and do not open fully when crushed by standard processes. Therefore, traditional cell opening methods such as the use of less gelling catalysts and less stabilizing silicones have provided only limited success in overcoming this problem. Generally, such cell opening approaches will lower the FTC only with concomitant reduction in other foam processing and foam properties.

The use of liquid polybutadiene as a release agent in the preparation of molded polyurethane and polyurea articles is disclosed in U.S. Pat. No. 5,079,270. This patent is directed to the formation of elastomeric or microcellular elastomeric articles without surface defects that are produced by a RIM process. No reference is made therein to the production of flexible foam with improved crushability and no examples are given in which a low density flexible polyurethane foam is produced. Liquid polybutadiene in an amount of 0.5% to 5% of the total weight of the components of the reaction is disclosed. Based on the compositions cited therein and typical formulations, the 0.5% of the '270 patent would correspond to at least 0.7 parts of liquid polybutadiene per hundred parts of polyol.

U.S. Pat. No. 5,614,566 discloses the use of liquid, higher molecular weight hydrocarbons, such as polybutadiene and polyoctenylene, in the production of rigid foams having an extensively open cell structure. The rigid foams of the '566 patent differ from the flexible foams of the present invention both in the foams' properties and in the components used in the production thereof, paticularly, the high hydroxyl number of the polyol component which, in the '566 patent, is between 100 and 800 (hydroxyl equivalent weights between 70 and 561). The hydroxyl number of flexible foam polyols is typically much less than 100.

Japanese Kokais JP 74-57325 and JP 92-57873 also disclose the use of liquid polybutadiene as a shrinkage inhibitor in rigid foam production.

Thus, the art fails to provide insights into the influence of liquid polybutadiene on the force required to crush flexible foams because rigid foams cannot undergo a crushing process without permanent deformation.

Accordingly, the present invention is directed to a chemical agent for use in high support (HS) and high support-high resilience (HS-HR) flexible foam that will lower the FTC at low use levels and have minimal influence on foam processing, foam odor, and other foam properties.

SUMMARY OF THE INVENTION

The present invention provides high support (HS) and high support-high resilience (HS-HR) flexible polyurethane foams that are prepared by the catalyzed reaction of one or more di- or polyisocyanates at an isocyanate index from about 70 to about 130 with:

a. a polyoxyalkylene polyol or polyoxyalkylene polyol blend having an average hydroxyl equivalent weight of at least about 1000 and an average primary hydroxyl content of at least about 25%;

b. an effective amount of a blowing agent containing water;

in the presence of from about 0.01 to about 0.5 parts by weight based on 100 parts by weight of said polyol component of a liquid hydrocarbon containing greater than 50% of polymerized butadiene.

DETAILED DESCRIPTION OF THE INVENTION

The high support (HS) and high support-high resilience (HS-HR) flexible polyurethane foams of the present invention are prepared by reacting an isocyanate component with a polyol component in the presence of water as a reactive blowing agent, further in the presence of one or more catalysts, foam stabilizing surfactants, and optionally other conventional additives and auxiliaries, e.g. chain extenders/crosslinkers, physical blowing agents, colorants, fillers, flame retardants, and the like. Examples of suitable isocyanates, catalysts, additives and auxiliaries may be found in U.S. Pat. No. 5,171,759, incorporated in its entirety herein by reference, in J. H. Saunders and K. C. Frisch, Polyurethanes: Chemistry and Technology, Interscience Publishers, NY, 1963, and the Polyurethane Handbook, Gunter Oertel, Ed., Hanser Publications, Munich, 1985.

The isocyanate component of the present invention may be one or more di- or polyisocyanates including, but not limited to, aliphatic, cycloaliphatic, and aromatic isocyanates. Preferred isocyanates include the commercially available mixtures of 2,4- and 2,6-toluenediisocyanate (TDI), generally furnished as an 80/20 or 65/35 isomer blend. Methylene diphenylene diisocyanates (MDI) are also useful in the present invention. Commercial mixtures of 2,2'-, 2,4', and 4,4'-methylene diphenylene diisocyanates are suitable, with preference given to mixtures containing substantial quantities of the 4,4'-isomer. Polymethylene polyphenylene polyisocyanates having functionalities greater than 2 (polymeric MDI) are also suitable, as are mixtures of TDI, MDI and/or polymeric MDI. Modified isocyanates such as urea-, urethane-, biuret-, and carbodiimide-modified isocyanates as non-limiting examples, are also suitable. The isocyanate preferably is present in an amount sufficient to provide an isocyanate index of from about 70 to about 130, more preferably about 80 to about 120, and most preferably, about 90 to about 115.

Water is preferably the sole blowing agent. However, additional reactive or non-reactive blowing agents may be included with water. Examples of such blowing agents include, but are not limited to, dichloromethane, difluorodichloromethane, 1,1-dichloro-1-fluoroethane, 1,1, 2-trichloro-1,2,2-trifluoroethane, hydrofluorocarbons (HFC's), perfluorocarbons (PFC's), lower alkanes such as butane, isobutane, pentane, cyclopentane, various low molecular weight ethers and ketones, and the like. Blowing agents such as air or other gases under pressure and liquid $CO_2$ under pressure may be used as well. Water, as stated above, is preferred, and in amounts preferably ranging from about 1 to about 7 parts per hundred parts polyol, and more preferably about 1 to about 5 parts.

The liquid hydrocarbons useful in the present invention preferably contain greater than 50% of polymerized butadiene and optionally may contain minor amounts of other comonomers. The preferred liquid hydrocarbon polymers contain solely polymerized butadiene and contain less than about 65% of 1,2 (vinyl) double bonds as a percentage of the total double bonds present. Most preferred are those butadiene polymers containing less than about 50% 1,2 (vinyl) double bonds.

Butadiene polymers and copolymers prepared by polymerizing butadiene alone or with other monomers in the presence of alkali metal or organic alkali metal as catalyst, are preferred in the present invention. To regulate the molecular weight thereby yielding a liquid polymer that is free of gels, a living polymerization is preferably carried out in a tetrahydrofuran medium or a chain transfer polymerization in which ethers such as dioxane and alcohols such as isopropyl alcohol are added and aromatic hydrocarbons such as toluene and xylene act as the chain transfer agent as well as the solvent. Other polymerization techniques, as known to those in the art, may be employed as well.

Examples of copolymers useful in the present invention include, but are not limited to, those containing butadiene polymerized with conjugated diolefins other than butadiene such as isoprene, 2,3-dimethylbutadiene and piperylene or with vinyl substituted aromatic compounds such as styrene, alpha-methyl styrene, vinyltoluene and divinylbenzene as the co-monomers. The co-monomers may be added throughout the polymerization or concentrated during a particular stage of the reaction such as at the end to form a capped product. Butadiene copolymers containing less than 50 percent by weight of said co-monomers, and more preferably, containing less than 30 percent by weight of said co-monomers may be used.

Surprisingly, butadiene polymers or copolymers that are substantially modified by partially oxidizing the butadiene polymer have been found to be ineffective in the present invention. In addition, butadiene polymers and copolymers containing active hydrogens that can react with isocyanate moieties such as hydroxyl-terminated polybutadienes are likewise ineffective. High molecular weight polybutadienes or butadiene copolymers, as typically produced by emulsion polymerization processes, are also ineffective.

As sold commercially, liquid butadiene polymers often contain impurities that impart a "rubber" chemical odor to products in which those polymers are incorporated. To avoid odor issues in flexible foam, therefore, it is desirable to keep the amount of the butadiene polymer to less than about 0.5 parts per hundred parts (php) and more preferably to less than about 0.3 php.

The polyol component may preferably be a polyoxyalkylene polyol component optionally mixed with other isocyanate reactive polymers such as hydroxy-functional polybutadienes, polyester polyols, amino-terminated polyether polyols, and the like. Among the polyoxyalkylene polyols that can be used are the alkylene oxide adducts of a variety of suitable initiator molecules. Examples include, but are not limited to, dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclohexanediol, 1,4-cyclohexanedimethanol, hydroquinone, hydroquinone bis(2-hydroxy-ethyl)ether, the various bisphenols, particularly bisphenol A and bisphenol F and bis(hydroxyalkyl)ether derivatives thereof, aniline, the various N-N-bis(hydroxyalkyl)anilines, primary alkyl amines and the various N-N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxyalkyl] ethylenediamines, toulene diamine and N,N,N',N'-tetrakis [hydroxyalkyl]toluene diamines; pentahydric initiators such as the various alkylglucosides, particularly α-methylglucoside; hexahydric initators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound.

Preferred polyoxyalkylene polyols for the production of HS and HS-HR foams of the present invention are the oxypropylene-oxyethylene adducts of glycols, glycerine, pentaerythritol, trimethylolpropane, sorbitol, and sucrose having a number average equivalent weight of at least about 1000 and a primary hydroxyl percentage of at least about 25%.

The most common process for polymerizing such polyols is the base-catalyzed addition of the oxide monomers to the active hydrogen groups of the polyhydric initiator and subsequently to the oligomeric polyol moieties. Potassium hydroxide and sodium hydroxide are the most commonly used basic catalysts. Polyols produced by this process can contain significant quantities of unsaturated monols resulting from the isomerization of oxypropylene monomer to allyl alcohol under the conditions of the reaction. This monofunctional alcohol can function as an active hydrogen site for further oxide addition.

A much preferred class of polyoxyalkylene polyols in the present invention are the low unsaturation (low monol) poly(oxypropylene/oxyethylene) polyols manufactured with double metal cyanide (DMC) catalyst. The poly (oxypropylene/oxyethylene) low unsaturation polyols used herein are prepared by oxyalkylating a suitably hydric initiator compound with propylene oxide and ethylene oxide in the presence of a double metal cyanide catalyst. Preferably, double metal cyanide complex catalysts such as those disclosed in U.S. Pat. Nos. 5,158,922 and 5,470,813, the contents of which are incorporated herein in their entireties by reference, are utilized, preferably for equivalent weights of greater than about 1000 Da, and more preferably for equivalent weights of about 1500 Da or higher. The equivalent weights and molecular weights expressed herein in Daltons (Da) are number average equivalent weights and molecular weights unless indicated otherwise. Random poly (oxypropylene/oxyethylene) polyols having low unsaturation, as described in U.S. Pat. No. 5,605,939, are particularly preferred. Preferably, the amount of ethylene oxide in the ethylene oxide/propylene oxide mixture is increased during the later stages of the polymerization to increase the primary hydroxyl content of the polyol. Alternatively, the low unsaturation polyol may be capped with ethylene oxide using non-DMC catalysts.

Where the oxyalkylation is performed in the presence of double metal cyanide (DMC) catalysts, it is preferable that initiator molecules containing strongly basic groups such as primary and secondary amines be avoided. Further, where employing double metal cyanide complex catalysts, it is generally desirable to oxyalkylate an oligomer which contains a previously oxyalkylated "monomeric" initiator molecule. It has been found, particularly with vicinal hydroxyl groups, that DMC oxyalkylation is initially slow and may be preceded by a considerable "induction period" where essentially no oxyalkylation takes place. Use of a polyoxyalkylene oligomer having an equivalent weight of from about 90 Da to about 1000 Da, preferably about 90 Da to about 500 Da has been found to mitigate those effects. The polyoxyalkylene oligomeric initiators may be prepared by oxylkylating a "monomeric" initiator in the presence of traditional basic catalysts such as sodium or potassium hydroxide or other non-DMC catalysts. It is typically necessary to neutralize and/or remove those basic catalysts prior to addition and initiation of the DMC catalyst.

Polyol polymer dispersions represent a specially preferred class of polyoxyalkylene polyol compositions for the production of HS and HS-HR foams. Polyol polymer dispersions are dispersions of polymer solids in a polyol. Polyol polymer dispersions that are useful in the present invention include, but are not limited to, the PHD and PIPA polymer modified polyols as well as the styrene-acrlyonitrile (SAN) polymer polyols. A PHD polyol contains a dispersion of a polyurea in the polyether polyol, formed in situ by polymerization of a diamine and an isocyanate, while a PIPA (polyisocyanate polyaddition) polyol contains a polymer dispersion formed by reaction of an alkanolamine with an isocyanate. In theory, any base polyol known in the art may be suitable for production of polymer polyol dispersions, however, the poly(oxyalkylene) polyols described previously herein are preferred in the present invention.

SAN polymer polyols are typically prepared by the in situ polymerization of one or more vinyl monomers, preferably acrylonitrile and styrene, in a polyol, preferably, a poly (oxyalkylene) polyol, having a minor amount of natural or induced unsaturation. Methods for preparing SAN polymer polyols are described in, for example, U.S. Pat. Nos. 3,304, 273; 3,383,351; 3,523,093; 3,652,639; 3,823,201; 4,104, 236; 4,111,865; 4,119,586; 4,125,505; 4,148,840 and 4,172, 825; 4,524,157; 4,690,956; Re-28715; and Re-29118.

SAN polymer polyols useful in the present invention preferably have a polymer solids content within the range of from about 3 to about 60 wt. %, more preferably, from about 5 to about 50 wt. %, based on the total weight of the SAN polymer polyol. As mentioned herein above, SAN polymer polyols are usually prepared by the in situ polymerization of a mixture of acrylonitrile and styrene in a polyol. Where used, the ratio of styrene to acrylonitrile polymerized in situ in the polyol is typically in the range of from about 100:0 to about 0:100 parts by weight, based on the total weight of the styrene/acrylonitrile mixture, and preferably from about 80:20 to about 0:100 parts by weight.

PHD polymer modified polyols are usually prepared by the in situ polymerization of an isocyanate mixture with a diamine and/or hydrazine in a polyol, preferably, a polyether polyol. Methods for preparing PHD polymer polyols are described in, for example, U.S. Pat. Nos. 4,089,835 and 4,260,530. PIPA polymer modified polyols are usually prepared by the in situ polymerization of an isocyanate mixture with a glycol and/or glycol amine in a polyol.

PHD and PIPA polymer modified polyols useful in the present invention preferably have a polymer solids content within the range of from about 3 to about 30 wt. %, more preferably, from about 5 to about 25 wt. %, based on the total weight of the PHD or PIPA polymer modified polyol. As mentioned herein above, PHD and PIPA polymer modified polyols of the present invention may be prepared by the in situ polymerization of an isocyanate mixture, for example, a mixture which is composed of about 80 parts by weight, based on the total weight of the isocyanate mixture, of 2,4-toluene diisocyanate and about 20 parts by weight, based on the total weight of the isocyanate mixture, of 2,6-toluene diisocyanate, in a polyol, preferably, a poly(oxyalkylene) polyol.

PHD and PIPA polymer modified polyols useful in the present invention preferably have hydroxyl values within the range of from about 15 to about 50, more preferably, from about 20 to about 40. Polyols used to prepare the PHD and PIPA polymer polyols of the present invention are preferably triols based on propylene oxide, ethylene oxide or mixtures thereof.

By the term "polyoxyalkylene polyol or polyoxyalkylene polyol blend" herein is meant the total of all polyoxyalkylene polyether polyols, whether polyoxyalkylene polyether polyols containing no polymer dispersion or the base polyol (s) of one or more polymer dispersions. As an example, in an isocyanate-reactive polyol containing 40 parts by weight of polymer polyol containing 30 weight percent vinyl polymer solids dispersed in a polyoxyalkylene polyether base polyol and 60 parts by weight of a polyoxyalkylene non-polymer-containing polyol, the polyoxyalkylene polyol component weight will be 88 parts by weight, i.e., [60 parts+(100−30)% of 40 parts]=88 parts.

The high support (HS) and high support-high resilience (HS-HR) flexible foams of the present invention are prepared by mixing together one or more isocyanates with the polyols, polymer polyol dispersions, water, catalysts, surfactants, liquid hydrocarbon containing polymerized butadiene and optionally various other ingredients including glycol or glycol amine modifier, flame retardants, physical blowing agents, colorants, fillers and other additives known to those in the art. After mixing, the foaming mixture may be deposited into an open container or continuously onto a moving conveyor and be allowed to rise freely (free-rise process). The open container or conveyor may be enclosed in a chamber to provide for foam rise under vacuum or with increased pressure (Variable Pressure Foaming Process). Alternatively, the foaming mixture may be deposited into a mold that is subsequently closed thus forcing the foam to take on the shape of the mold (molded process).

Hence, one possible HS-HR foam formulation of the present invention may contain the following components:
a) 80/20 isomer ratio of 2,4/2,6 toluenediisocyanate present at a level to yield a stoichiometric index of 103 relative to the isocyanate reactive components in the formulation;
b) 100 parts by weight of a polyol-polymer polyol blend containing
  1) 67% of a 28 hydroxyl, low unsaturation polyol containing oxypropylene-oxyethylene polymerized onto glycerin yielding a nominal triol with a total oxyethylene content of 21% in which a third of the oxyethylene was incorporated randomly in the interior of the polyol and two thirds was added during the final stage of the polymerization by feeding a 70/30 ratio of EO/PO,
  2) 33% of a polymer polyol containing 25% SAN copolymer dispersed in 75% of a reactive polyol produced by the KOH catalyzed alkoxylation of glycerin with oxypropylene and capped with 17% oxyethylene; the reactive polyol having an hydroxyl number of 32, a nominal functionality of 2.9 and a primary hydroxyl value of about 85%;

c) water in an amount from 3.3 parts per hundred parts (php) of b);
d) a liquid hydrocarbon containing polymerized butadiene in an amount between 0.01 and 0.5 php;
e) diethanolamine in an amount from 2.5 php;
f) a suitable level of blended tertiary amine catalyst, such as NIAX® C-183, and optionally a "gelling" catalyst such as dibutyltindilaurate,
g) an HS or HS-HR foam surfactant, such as NIAX® L-5309 polyether-silicone copolymer, in an amount from 1.0 php; and,
h) other standard additives as needed.

Components b) through h) may be premixed and added as a combined stream as is done in an A-side, B-side molding process or added individually or in various combinations as is often done in a continuous free-rise process. Nucleating gas may be injected or dissolved into one or more of the components to aid in cell size control and to promote cell opening. Physical blowing agents such as methylene chloride, acetone or pentane may be added to lower the foam density and to soften the foam. A preferred physical blowing agent is carbon dioxide which may be added as a pressurized liquid as prescribed by the manufacturers of equipment for such processes [NOAVFLEX (Hennecke Machinery), Car-Dio (Cannon Viking Limited), and CO-2 (Beamech)].

The following examples further illustrate details of the present invention. The invention, which is set forth in the present disclosure, is not to be limited either in spirit or scope by these examples. Those skilled in the art will readily appreciate that known variations of the conditions of the following procedures may be used. Unless otherwise noted, all temperatures are given in degrees Celsius and all parts and percentages are by weight.

EXAMPLES

The following components were used in the working examples of the present application:

Polyols:

| | |
|---|---|
| Polyol A: | A DMC-produced poly(oxyethylene-oxpropylene) polyol having a hydroxyl number of about 28, a nominal functionality of 3, and a total copolymerized EO content of 21% in which 7% of the ethylene oxide was fed during the initial phase of the reaction and the remaining 14% was fed during the final tipping stage at 70/30 EO/PO weight ratio. The primary hydroxyl content was ~44%. |
| Polyol B: | A DMC-produced poly(oxyethylene-oxpropylene) polyol having a hydroxyl number of about 28, a nominal functionality of 3, and a total copolymerized EO content of 20% in which 10% of the ethylene oxide was fed during the initial phase of the reaction and the remaining 10% was fed during the final tipping stage at a 50/50 EO/PO weight ratio. The primary hydroxyl content was ~25%. |
| Polyol C: | A DMC-produced poly(oxyethylene-oxpropylene) polyol having a hydroxyl number of about 24, a nominal functionality of 3, and a total copolymerized EO content of 18% in which all of the ethylene oxide was fed during the final tipping stage of the polymeriztion at a 50/50 EO/PO weight ratio. The primary hydroxyl content was ~30%. |
| Polyol D: | A hybrid DMC-KOH poly(oxyethylene-oxpropylene) polyol having a hydroxyl number of about 25, a nominal functionality of 2.6, and a total copolymerized EO content of 20% in which 5% of the ethylene oxide was fed during the initial DMC-catalyzed phase of the reaction, and the remaining 15% was fed during the final KOH capping stage at 100% EO. The primary hydroxyl content was ~88%. |

Polymer Polyols:

| | |
|---|---|
| PP-1: | A 28% dispersion of styrene-acrylonitrile in a reactive base polyol blend. The base polyols were produced by KOH-catalyzed addition of PO to starters and capping with 100% EO. The average hydroxyl number of the polyol blend was 36, the nominal functionality was 2.9, the % EO in the polyol was 19%, and the primary hydroxyl content was ~85%. |
| PP-2: | A 25% dispersion of styrene-acrylonitrile in a reactive base polyol blend. The base polyols were produced by KOH-catalyzed addition of PO to starters and capping with 100% EO. The average hydroxyl number of the polyol blend was 32, the nominal functionality was 2.9, the % EO in the polyol was 17%, and the primary hydroxyl content was ~85%. |
| PP-3: | A 26% dispersion of styrene-acrylonitrile in a reactive base polyol blend. The base polyols were produced by KOH-catalyzed addition of PO to starters and capping with 100% EO. The average hydroxyl number of the polyol blend was 32, the nominal functionality was 3.3, the % EO in the polyol was 16%, and the primary hydroxyl content was 85%. |
| PP-4: | A 43% dispersion of styrene-acrylonitrile in a reactive base polyol. The base polyol was produced by KOH-catalyzed addition of PO to starter and capping with 100% EO. The average hydroxyl number of the polyol blend was 36, the nominal functionality was 2.9, the % EO in the polyol was 19%, and the primary hydroxyl content was ~85%. |
| PP-5: | An 8% dispersion of styrene-acrylonitrile in a reactive base polyol blend. The base polyols were produced by KOH-catalyzed addition of PO to starters and capping with 100% EO. The average hydroxyl number of the polyol blend was 34, the nominal functionality was 4.4, the % EO in the polyol was 17%, and the primary hydroxyl content was 85%. |
| PP-6: | A 9% dispersion of styrene-acrylonitrile in a reactive base polyol blend. The base polyols were produced by KOH-catalyzed addition of PO to starters and capping with 100% EO. The average hydroxyl number of the polyol blend was 33, the nominal functionality was 3.2, the % EO in the polyol was 17%, and the primary hydroxyl content was ~85%. |

Additives:

| | |
|---|---|
| DEOA | Diethanolamine; |
| C-183 | An amine catalyst blend available from Witco; |
| C-267 | An amine catalyst blend available from Witco; |
| T-9 | A stannous octaoate catalyst available from Air Products; |
| T-120 | Tin (IV) catalyst available from Air Products; |
| B-8707 | A high resilience (HR) silicone surfactant available from Goldschmidt; |
| L-5309 | A high resilience (HR) silicone surfactant available from Witco; |
| U-2000 | A high resilience (HR) silicone surfactant available from Witco; |
| Y-10366 | A high resilience (HR) silicone surfactant available from OSi Specialties; and |
| DE-60F-SP | A flame retardant containing a brominated aromatic compound and an organo(chlorophosphate) available from Great Lakes Chemical Co. |

The effectiveness of liquid hydrocarbon containing polymerized butadiene in lowering the force-to-crush (FTC) of high support (HS) and high support-high resilience (HS-HR) polyurethane foams is demonstrated by the following examples. The bench scale free-rise foams were prepared by weighing together all of the ingredients except the isocyanate and stannous octoate, where employed, into a one-half gallon (1.9 L) paper can with metal baffle insert, followed by mixing at 2400 rpm for 60 s. This resin mixture was allowed to stand for 15 s. during which time the stannous octoate, if used, was added. Mixing was resumed for 15 s. with the isocyanate being added with seven seconds left in this mixing period. This complete mixture was quickly poured into a 14 in.×14 in.×6 in. (35.6 cm×35.6 cm×15.2 cm) cake box and allowed to rise. The foam rise profile, "blow-off", and settle were recorded for five minutes using a sonar device with computer data collection. The foam bun and box were placed in a forced air oven for five minutes at 125° C. to cure the skin. After removing from the oven, the foam was allowed to cure at ambient conditions for at least 16 hrs. Indications of shrinkage were noted and a 12 in.×12 in.×4 in. (30.5 cm×30.5 cm×10.2 cm) sample of the cured foam was cut from the center of the bun for force-to-crush (FTC) and physical property measurements.

Force-to-crush (FTC) was measured on the uncrushed 12 in.×12 in.×4 in. (30.5 cm×30.5 cm×10.2 cm) samples using a standard IFD tester and 50 sq. in. (322.6 sq. cm) indentor foot. The foam height was measured by lowering the foot slowly until a resistance of 0.5 lbs. (226.8 g) was detected. The foot was next forced into the foam at 20 in./min. (50.8 cm/min.) to 25% of the measured height (75% compression) and the force immediately recorded. The foot was immediately returned to the initial foam height and a second compression cycle and force measurement initiated. This process was repeated a third time to complete the measurement. Thus, three force measurements, $1^{st}$ cycle (FTC1), $2^{nd}$ cycle (FTC2), $3^{rd}$ cycle (FTC3) were obtained on each sample. The first measurement provides an indication of how much force is required to crush the foam initially, whereas the difference between the second (FTC2) and third (FTC3) values indicates how effective the initial crushing cycle was in opening the foam.

Prior to physical and mechanical property testing, the full test blocks were crushed by passing three times through a lab roller crusher (87.5% compression) and were allowed to age for at least 16 hrs. under standard constant temperature (25° C.) and relative humidity (50%) conditions. Standard test procedures as set forth in ASTM D 3574 were followed for determining density, resilience, IFD, tear strength, 90% dry compression set and 75% humid aged compression set (conditions J1). The tensile strength and elongation procedures were similar to those described in ASTM D 3574, except, a jaws separation method was employed rather than bench marks. Air flow was measured on 2 in.×2 in.×1 in. (5.1 cm×5.1 cm×2.5 cm) specimens using an AMSCOR Model 1377 Foam Porosity Instrument. The 50% Wet Set procedure was comparable to the ASTM compression set procedure, except the specimens were compressed and held under humid conditions (50% compression for 22 hrs. at 50° C. and 95% relative humidity). Height loss was measured 30 min. after removal from the oven and plates.

The molded foam production and testing procedures were comparable to those used in the free-rise process except that the foaming mixture was poured into a standard aluminum test pad mold 15 in.×15 in.×4 in. (38.1 cm×38.1 cm×10.2 cm) that was preheated to ~55° C. The sample was removed from the mold after 5 min. and the FTC measurement was immediately performed on the hot specimen. The samples were allowed to age for one week before fully crushing the foam and performing the property measurements.

Foam Examples 1–7

FTC and physical properties of the foams prepared in Examples 1-7 were determined and are summarized below in Table 1.

As can been seen by reference to Table 1, free-rise foam Examples 2, 3, 4 illustrate that 0.5 php of three different liquid butadiene homopolymers (PB-A, PB-B, PB-C) having viscosities of 3500, 700 and 4000 cPs at 25° C. and 1,2 vinyl percentages of 18, 24 and 20, respectively were effective at lowering the FTC1 from 420 lbs. (Comparative Example 1) to 231, 170 and 198 lbs., respectively. The crushing efficiency was also improved as evidenced by the reduction in the difference between the second and third cycle FTC value from 27 to 7, 5, and 5, respectively. The physical properties of the foams (also in Table 1) in Examples 2, 3 and 4 were essentially unchanged relative to Comparative Example 1. Examples 5, 6 and 7 indicate that 0.5 php of liquid butadiene homopolymers that are high in 1,2 vinyl content destabilize the foam causing collapse. The polyol composition used in Examples 1–7 contained 67% of DMC-catalyzed triol (Polyol A) and 33% of a polymer polyol containing 28% SAN solids in a reactive base polyol made via KOH catalysis.

TABLE 1

|  | Ex. C-1 | Ex. 2 | Ex. 3 | Ex. 4 | Ex. 5 | Ex. 6 | Ex. 7 |
| --- | --- | --- | --- | --- | --- | --- | --- |
| Polybutadiene (0.5 php) | none | PB-A | PB-B | PB-C | PB-D | PB-E | PB-F |
| 1,2-Vinyl % | — | 18 | 24 | 20 | 70 | 70 | 90 |
| MW | — | 5500 | 2600 | 5000 | 1300 | 1800 | 3200 |
| Viscosity @ 25° C. (cps) | — | 3500 | 700 | 4000 | 1600 | 6000 | >10,000 |
| Foam Processing | Good | Good | Good | Good | Collapse | Collapse | Collapse |
| FTC1 | 420 | 231 | 170 | 198 |  |  |  |
| FTC2 | 143 | 99 | 93 | 88 |  |  |  |
| FTC3 | 116 | 92 | 88 | 83 |  |  |  |
| FTC2–FTC3 | 27 | 7 | 5 | 5 |  |  |  |
| Foam Properties |  |  |  |  |  |  |  |
|  |  |  |  |  |  |  |  |
| Density (pcf) | 1.80 | 1.84 | 1.86 | 1.80 |  |  |  |
| Resilience (%) | 53 | 46 | 48 | 47 |  |  |  |
| Air Flow (scfpm) | 1.75 | 1.19 | 5.30 | 2.81 |  |  |  |
| IFD-Thickness (in.) | 4.02 | 4.03 | 4.00 | 4.01 |  |  |  |
| 25% IFD, lb./50 in.$^2$ | 19.6 | 19.3 | 21.4 | 19.3 |  |  |  |
| 65% IFD, lb./50 in.$^2$ | 43.2 | 42.5 | 47.1 | 41.0 |  |  |  |
| 65/25 Return Value (%) | 79.6 | 80.4 | 78.5 | 79.6 |  |  |  |
| 65/25 IFD ratio | 2.20 | 2.21 | 2.20 | 2.13 |  |  |  |
| Tensile (psi) | 15.3 | 16.2 | 16.4 | 16.6 |  |  |  |
| Elongation (%) | 151 | 154 | 172 | 165 |  |  |  |
| Tear (pli) | 1.53 | 1.55 | 1.54 | 1.68 |  |  |  |
| 90% Comp. Set (Cd) (%) | 12.7 | 8.7 | 5.0 | 22.3 |  |  |  |

TABLE 1-continued

|  | Ex. C-1 | Ex. 2 | Ex. 3 | Ex. 4 | Ex. 5 | Ex. 6 | Ex. 7 |
|---|---|---|---|---|---|---|---|
| 75% HACS (Cd) (%) | 12.1 | 13.6 | 12.3 | 13.6 |  |  |  |
| 50% Wet set (%) | 33.4 | 31.7 | 32.4 | 31.3 |  |  |  |

In addition to the noted polybutadiene homopolymers, the above foam formulations also included: 67 php of Polyol P-4; 32 php of Polymer Polyol PP-4; 3.3 php of water; 2.5 php of DEOA; 0.12 php of C-267; 0.13 php of T-9; 1.0 php of L-5309; and 43.6 php of 80/20 TDI at an isocyanate index of 103.

Foam Examples 8–13

FTC and physical properties of the foams prepared in Examples 8–13 were determined and are summarized below in Table 2.

As can been seen by reference to Table 2, free-rise foam Example 9 and molded foam Example 12 demonstrate that 1 php of liquid butadiene homopolymer (PB-C) effectively lowers the FTC1 from 384 to 187 lbs. (free-rise) and from 299 to 199 lbs. (molded). Though effective in lowering the FTC, it was found that this level of butadiene homopolymer imparted a noticeable rubber chemical odor to the foams that was slow to dissipate. Free-rise foam Example 10 and molded foam Example 13 demonstrate that high MW weight solid polybutadiene homopolymer (PB-G), as produced via an emulsion polymerization process, is ineffective at lowering the FTC. Thus, a liquid butadiene polymer appears to be necessary to lower the FTC.

Foam Examples 14–20

FTC and physical properties of the foams prepared in Examples 14–20 were determined and are summarized below in Table 3.

As can been seen by reference to Table 3, free-rise foam Examples 14–20 show that although phenyl-terminated polybutadiene (Ex. 14 and 15) is somewhat effective at lowering the initial FTC and improving the crushing efficiency, hydroxyl-terminated polybutadiene (Ex. 16), acrylate-terminated polybutadiene (Ex. 17) and a copolymer of butadiene and acrylonitrile (Ex. 18) were ineffective in lowering the initial FTC and improving the crushing efficiency. Polyisobutylene homopolymer (Ex. 19) caused collapse and mineral oil (Ex. 20) was ineffective. These results demonstrate that hydrocarbons based largely on polymerized butadiene are uniquely effective in lowering FTC while maintaining other foam properties.

TABLE 2

|  | Ex. C-8 | Ex. 9 | Ex. 10 | Ex. C-11 | Ex. 12 | Ex. 13 |
|---|---|---|---|---|---|---|
| Polybutadiene | none | PB-C (1 php) | PB-G (0.6 php) | none | PB-C (1 php) | PB-G (1 php) |
| 1,2-Vinyl % | — | 20 | <20 | — | 20 | <20 |
| MW | — | 5000 | >50,000 | — | 5000 | >50,000 |
| Viscosity @ 25° C. (cps) | — | 4000 | solid | — | 4000 | solid |
| Foam Processing | Good | Good | Good | Good | Good | Good |
| FTC1 | 384 | 187 | 364 | 299 | 199 | 501 |
| FTC2 | 147 | 106 | 140 | 119 | 79 | 246 |
| FTC3 | 112 | 98 | 111 | 90 | 64 | 147 |
| FTC2–FTC3 | 35 | 8 | 29 | 29 | 15 | 99 |
| Foam Properties |  |  |  |  |  |  |
| Density (pcf) | 1.58 | 1.85 | 1.64 | 2.02 | 2.03 | 1.97 |
| Resilience (%) | 47 | 46 | 50 | 57 | 51 | 56 |
| Air Flow (scfpm) | 0.89 | 1.23 | 0.96 | 0.60 | 0.47 | 0.91 |
| IFD-Thickness (in.) | 3.92 | 3.98 | 3.90 | 4.73 | 4.77 | 4.66 |
| 25% IFD, lb./50 in.$^2$ | 16.2 | 20.4 | 15.9 | 44.8 | 47.3 | 33.4 |
| 65% IFD, lb./50 in.$^2$ | 38.2 | 46.8 | 40.2 | 110.0 | 111.9 | 87.7 |
| 65/25 Return Value (%) | 78.0 | 79.9 | 78.3 | 76.1 | 75.1 | 78.3 |
| 65/25 IFD ratio | 2.35 | 2.30 | 2.54 | 2.46 | 2.37 | 2.62 |
| Tensile (psi) | 16.1 | 15.7 | 15.5 | 20.1 | 21.0 | 18.5 |
| Elongation (%) | 190 | 142 | 168 | 123 | 134 | 106 |
| Tear (pli) | 1.49 | 1.36 | 1.32 | 1.84 | 2.02 | 1.51 |
| 90% Comp. Set (Cd) (%) | 11.9 | 6.5 | 11.4 | — | — | — |
| 75% HACS (Cd) (%) | 18.5 | 15.2 | 20.7 | 7.4 | 7.5 | 8.8 |
| 50% Wet set (%) | 42.7 | 38.3 | 41.3 | 22.6 | 22.5 | 22.8 |

The free-rise foams (Ex. 8–10) further included 64 php of Polyol P-2; 36 php of Polymer Polyol PP-2; 3.2 php of water; 2.6 php of DEOA; 0.15 php of C-183; 0.15 php of T-9; 2.0 php of B-8707; and 42.7 php of 80/20 TDI at an isocyanate index of 103. The molded foams (Ex. 11–13) further included 42.5 php of Polyol P-3; 57.5 php of Polymer Polyol PP-3; 2.7 php of water; 0.5 php of DEOA; 0.5 php of glycerin; 0.4 php of C-183; 0.05 php of T-120; 1.0 php of Y-10366; and 40.14 php of 80/20 TDI at an isocyanate index of 100.

TABLE 3

|  | Ex. 14 | Ex. 15 | Ex. 16 | Ex. 17 | Ex. 18 | Ex. 19 | Ex. 20 |
|---|---|---|---|---|---|---|---|
| Polyadditive (0.5 php) | Phenyl-terminated butadiene | Phenyl-terminated butadiene | Hydroxyl-terminated butadiene | Acrylate-terminated butadiene | Butadiene-acrylonitrile | Polyiso butylene | Mineral Oil |
| 1,2-Vinyl % | 45 | 35 | 20 | — | — | — | — |
| MW | 2600 | 1500 | 6200 | 13,000 | 2800 | 800 | -32 |
| Viscosity @ 25° C. (cps) | >10,000 | 3000 | — | >10,000 | — | >10,000 | — |
| Foam Processing | Good | Good | Good | Good | Good | Collapse | Good |
| FTC1 | 310 | 256 | 431 | 345 | 464 | — | 556 |
| FTC2 | 102 | 20 | 226 | 110 | 134 | — | 131 |
| FTC3 | 90 | 111 | 104 | 97 | 109 | — | 112 |
| FTC2–FTC3 | 12 | 9 | 122 | 13 | 25 | — | 19 |
| Foam Properties |  |  |  |  |  |  |  |
| Density (pcf) | 1.81 | 1.77 | 1.81 | 1.78 | 1.80 | — | 1.92 |
| Resilience (%) | 51 | 44 | 52 | 51 | 52 | — | 53 |
| Air Flow (scfpm) | 3.49 | 0.79 | 2.56 | 2.67 | 1.70 | — | 1.50 |
| IFD-Thickness (in.) | 3.95 | 4.02 | 3.99 | 3.99 | 4.01 | — | 3.96 |
| 25% IFD, lb./50 in.$^2$ | 18.0 | 27.2 | 18.9 | 20.9 | 20.8 | — | 20.6 |
| 65% IFD, lb./50 in.$^2$ | 40.3 | 52.2 | 41.0 | 44.6 | 43.4 | — | 47.3 |
| 65/25 Return Value (%) | 81.6 | 76.1 | 79.2 | 78.8 | 78.2 | — | 80.6 |
| 65/25 IFD ratio | 2.24 | 1.92 | 2.17 | 2.14 | 2.09 | — | 2.30 |
| Tensile (psi) | 15.8 | 15.9 | 16.0 | 16.7 | 15.1 | — | 16.4 |
| Elongation (%) | 157 | 153 | 159 | 158 | 160 | — | 157 |
| Tear (pli) | 1.53 | 1.79 | 1.57 | 1.33 | 1.56 | — | 1.60 |
| 90% Comp. Set (Cd) (%) | 7.1 | 6.0 | 13.7 | 6.5 | 21.3 | — | 4.6 |
| 75% HACS (Cd) (%) | 11.5 | 8.9 | 11.9 | 11.0 | 10.9 | — | 13.6 |
| 50% Wet set (%) | 30.2 | 24.6 | 29.5 | 31.2 | 28.1 | — | 31.1 |

In addition to 0.5 php of the polyadditive noted in Table 3, the foam formulations included 67 php of Polyol P-1; 32 php of Polymer Polyol PP-1; 3.3 php of water; 2.5 php of DEOA; 0.12 php of C-267; 0.13 php of T-9; 1.0 php of L-5309; and 43.6 php of 80/20 TDI at an isocyanate index of 103.

Foam Examples 21–24 and 25–28

FTC and physical properties of the foams prepared in Examples 21–28 were determined and are summarized below in Table 4.

As can be seen by reference to Table 4, free-rise foam Examples 21–28 demonstrate that liquid polybutadiene is effective at lowering the FTC and improving crushing efficiency at use levels from 1 php down to about 0.03 php. High use level was not found to be better than the lower use levels. An unpleasant rubber chemical odor was noticeable at the 1 php level. Foam physical properties were essentially unaffected. The foams in Examples 21–24 were made with a polymer polyol blend containing 70% of a reactive base polyol in which the core was produced via DMC catalysis and capped with EO using KOH catalysis. This was blended with 30% of a 43% SAN solids polymer polyol made in a KOH-catalyzed reactive polyol. The same polyols were used in Examples 25–28, except the ratio was 80% of the polyol and 20% of the polymer polyol.

TABLE 4

|  | Ex. C-21 | Ex. 22 | Ex. 23 | Ex. 24 | Ex. C-25 | Ex. 26 | Ex. 27 | Ex. 28 |
|---|---|---|---|---|---|---|---|---|
| Polybutadiene PB-A (php) | 0 | 0.13 | 0.07 | 0.03 | 0 | 0.17 | 0.33 | 1 |
| Polyol P-4 (php) | 70 | 70 | 70 | 70 | 80 | 80 | 80 | 80 |
| Polymer Polyol PP-4 | 30 | 30 | 30 | 30 | 20 | 20 | 20 | 20 |
| Foam Processing | Good | Good | Good | Good | Good | Good | Good | Good |
| FTC1 | 319 | 178 | 189 | 186 | 351 | 222 | 192 | 268 |
| FTC2 | 113 | 99 | 100 | 97 | 120 | 95 | 95 | 91 |
| FTC3 | 105 | 27 | 97 | 94 | 109 | 92 | 92 | 88 |
| FTC2–FTC3 | 8 | 2 | 3 | 3 | 11 | 3 | 3 | 3 |
| Foam Properties |  |  |  |  |  |  |  |  |
| Density (pcf) | 1.83 | 1.91 | 1.88 | 1.93 | 2.03 | 1.96 | 1.94 | 1.887 |
| Resilience (%) | 60 | 60 | 60 | 60 | 65 | 64 | 65 | 64 |
| Air Flow (scfpm) | 2.50 | 2.46 | 2.11 | 2.44 | 2.30 | 3.36 | 2.36 | 2.24 |
| IFD-Thickness (in.) | 3.96 | 4.03 | 3.99 | 4.02 | 4.04 | 4.02 | 4.01 | 4.05 |
| 25% IFD, lb./50 in.$^2$ | 20.1 | 20.6 | 20.5 | 19.6 | 21.9 | 22.8 | 22.2 | 22.5 |
| 65% IFD, lb./50 in.$^2$ | 46.7 | 47.8 | 47.5 | 45.9 | 51.0 | 51.3 | 50.6 | 50.9 |
| 65/25 Return Value (%) | 80.4 | 81.2 | 81.1 | 80.7 | 83.8 | 84.3 | 83.8 | 82.2 |
| 65/25 IFD ratio | 2.32 | 2.32 | 2.32 | 2.35 | 2.33 | 2.25 | 2.28 | 2.26 |
| Tensile (psi) | 17.8 | 17.7 | 18.0 | 17.5 | 18.2 | 16.0 | 16.9 | 18.3 |
| Elongation (%) | 156 | 132 | 158 | 153 | 144 | 135 | 156 | 138 |
| Tear (pli) | 1.73 | 1.74 | 1.86 | 2.00 | — | 1.4 | 1.48 | 1.60 |
| 90% Comp. Set (Cd) (%) | 10.9 | 7.9 | 13.8 | 9.6 | 5.5 | 4.6 | 5.0 | 5.7 |

TABLE 4-continued

|  | Ex. C-21 | Ex. 22 | Ex. 23 | Ex. 24 | Ex. C-25 | Ex. 26 | Ex. 27 | Ex. 28 |
| --- | --- | --- | --- | --- | --- | --- | --- | --- |
| 75% HACS (Cd) (%) | 30.1 | 26.4 | 24.3 | 25.0 | 17.5 | 13.5 | 17.3 | 18.0 |
| 50% Wet set (%) | 32.7 | 34.8 | 30.8 | 32.3 | 14.5 | 15.6 | 13.9 | 18.2 |

In addition to the amounts of polybutadiene PB-A, Polyol P-4 and Polymer Polyol PP-4 noted in Table 4, foam formulations 21–24 also included 3.3 php of water; 2.5 php of DEOA; 0.12 php of C-183; 0.13 php of T-9; 1.0 php of U-2000; and 43.6 php of 80/20 TDI at an isocyanate index of 103, whereas foam formulations 25–28 also included 3.3 php of water, 2.5 php of DEOA, 0.15 php of C-183, 0.10 php of T-9, 1.0 php of U-2000, 2.0 php of DE-60F and 43.6 php of 80/20 TDI at an isocyanate index of 103.

Foam Examples 29–32

FTC and physical properties of the foams from Examples 21–28 were determined and are summarized below in Table 5.

TABLE 5

|  | Ex. C-29 | Ex. 30 | Ex. C-31 | Ex. 32 |
| --- | --- | --- | --- | --- |
| Polybutadiene PB-A (php) | none | 0.13 | none | 0.05 |
| Polymer Polyol PP-5 | 100 | 100 | — | — |
| Polymer Polyol PP-6 | — | — | 100 | 100 |
| Foam Processing | Good | Good | Good | Good |
| FTC1 | 219 | 200 | 227 | 197 |
| FTC2 | 120 | 110 | 103 | 103 |
| FTC3 | 116 | 108 | 100 | 101 |
| FTC2–FTC3 | 4 | 3 | 3 | 2 |
| Foam Properties |  |  |  |  |
| Density (pcf) | 1.92 | 1.90 | 1.87 | 1.94 |
| Resilience (%) | 58 | 61 | 61 | 61 |
| Air Flow (scfpm) | 3.21 | 5.01 | 3.37 | 3.70 |
| IFD-Thickness (in.) | 4.05 | 4.03 | 3.98 | 3.99 |
| 25% IFD, lb./50 in.$^2$ | 23.8 | 22.9 | 20.3 | 21.3 |
| 65% IFD, lb./50 in.$^2$ | 52.7 | 50.8 | 46.7 | 48.8 |
| 65/25 Return Value (%) | 81.8 | 81.6 | 81.1 | 82.0 |
| 65/25 IFD ratio | 2.21 | 2.21 | 2.30 | 2.29 |
| Tensile (psi) | 13.4 | 13.1 | 15.8 | 15.8 |
| Elongation (%) | 103 | 117 | 127 | 123 |
| Tear (pli) | 0.98 | 0.32 | 1.41 | 1.45 |
| 90% Comp. Set (Cd) (%) | 6.0 | 5.0 | 7.7 | 6.7 |
| 75% HACS (Cd) (%) | 8.9 | 8.8 | 41.8 | 8.4 |
| 50% Wet set (%) | 15.9 | 15.9 | 24.8 | 22.2 |

In addition to the amounts of polybutadiene PB-A, Polymer Polyol PP-5 or Polymer Polyol PP-6 noted in Table 5, the foam formulations also included 3.3 php of water; 2.5 php of DEOA; 0.12 php of C-183; 0.13 php of T-9; 1.0 php of U-2000; and 44 php of 80/20 TDI at an isocyanate index of 103.

As can be seen by reference to Table 5, free-rise foam Examples 29–32 illustrate that liquid polybutadiene also offers improvements in the FTC of foams produced with polymer polyols containing only polyols produced with KOH catalysis. The magnitude of the effect is somewhat lower due to the lower FTC of the comparative foams (Ex. C-29 and C-31) made without polybutadiene.

Although the invention has been described in detail in the foregoing for the purpose of illustration, it is to be understood that such detail is solely for that purpose and that variations can be made therein by those skilled in the art without departing from the spirit and scope of the invention except as it may be limited by the appended claims.

What is claimed is:

1. A high support (HS) or high support-high resilience (HS-HR) flexible polyurethane foam prepared by the catalyzed reaction of one or more di- or polyisocyanates at an isocyanate index from about 70 to about 130 with:

(a) a polyoxyalkylene polyol or polyoxyalkylene polyol blend having an average hydroxyl equivalent weight of at least about 1000 and an average primary hydroxyl content of at least about 25%; and (b) an effective amount of a blowing agent comprising water, in the presence of from about 0.01 to about 0.5 parts by weight based on 100 parts by weight of said polyol component (a) of a liquid hydrocarbon comprising greater than 50% of polymerized butadiene.

2. The high support (HS) or high support-high resilience (HS-HR) flexible polyurethane foam according to claim 1, wherein said liquid hydrocarbon comprises from about 0.01 to about 0.3 parts by weight.

3. The high support (HS) or high support-high resilience (HS-HR) flexible polyurethane foam according to claim 1, wherein said polyol component (a) comprises a polyoxyalkylene polyol at least partially prepared in the presence of a double metal cyanide complex oxyalkylation catalyst.

4. The high support (HS) or high support-high resilience (HS-HR) flexible polyurethane foam according to claim 1, wherein said polyol polyoxyalkylene blend comprises at least one polyol comprising a polyoxyalkylene polyol at least partially prepared in the presence of a double metal cyanide complex oxyalkylation catalyst.

5. The high support (HS) or high support-high resilience (HS-HR) flexible polyurethane foam according to claim 1, wherein said polyol blend further includes one or more polyol polymer dispersions effective to provide a solids content of from about 3 to about 50 weight percent based on the weight of said polyol blend.

6. The high support (HS) or high support-high resilience (HS-HR) flexible polyurethane foam according to claim 1, wherein said isocyanate index is between about 80 and about 120.

7. The high support (HS) or high support-high resilience (HS-HR) flexible polyurethane foam according to claim 1, wherein said isocyanate index is between about 90 and about 115.

8. The high support (HS) or high support-high resilience (HS-HR) flexible polyurethane foam according to claim 1, wherein said blowing agent comprises water in an amount from about 1 to about 7 parts by weight per 100 parts of said polyol component (a).

9. The high support (HS) or high support-high resilience (HS-HR) flexible polyurethane foam according to claim 1, wherein said blowing agent comprises water in an amount from about 1 to about 5 parts by weight per 100 parts of said polyol component (a).

10. The high support (HS) or high support-high resilience (HS-HR) flexible polyurethane foam according to claim 1, wherein said liquid hydrocarbon is free of isocyanate reactive groups.

11. The high support (HS) or high support-high resilience (HS-HR) flexible polyurethane foam according to claim 1, wherein said blowing agent further includes at least one member selected from the group consisting of dichloromethane, difluorodichloromethane, 1,1-dichloro-1-fluoroethane, 1,1,2-trichloro-1,2,2-trifluoroethane, hydrofluorocarbons (HFC's), perfluorocarbons (PFC's), lower alkanes low molecular weight ethers and ketones, air and liquid $CO_2$ under pressure.

12. The high support (HS) or high support-high resilience (HS-HR) flexible polyurethane foam according to claim 1, wherein said liquid hydrocarbon comprises polybutadiene.

13. The high support (HS) or high support-high resilience (HS-HR) flexible polyurethane foam according to claim 12, wherein less than 65% of unsaturation in said polybutadiene is of 1,2 vinyl type.

14. The high support (HS) or high support-high resilience (HS-HR) flexible polyurethane foam according to claim 12, wherein less than 50% of unsaturation in said polybutadiene is of 1,2 vinyl type.

15. A method for producing a high support (HS) or high support-high resilience (HS-HR) flexible polyurethane foam comprising reacting one or more di- or polyisocyanates at an index from about 70 to about 130 and in the presence of a catalyst with
    (a) a polyoxyalkylene polyol or polyoxyalkylene polyol blend having an average hydroxyl equivalent weight of at least about 1000 and an average primary hydroxyl content of at least about 25%, and
    (b) an effective amount of a blowing agent comprising water,
in the presence of from about 0.01 to about 0.5 parts by weight based on 100 parts by weight of said polyol component of a liquid hydrocarbon comprising greater than 50% of polymerized butadiene.

16. The method according to claim 15, wherein said polyol component (a) comprises a polyoxyalkylene polyol at least partially prepared in the presence of a double metal cyanide complex oxyalkylation catalyst.

17. The method according to claim 15, wherein said polyol polyoxyalkylene blend comprises at least one polyol comprising a polyoxyalkylene polyol at least partially prepared in the presence of a double metal cyanide complex oxyalkylation catalyst.

18. The method according to claim 15, wherein said polyol blend further includes one or more polyol polymer dispersions effective to provide a solids content of from about 3 weight percent to about 50 weight percent based on the weight of said polyol blend.

19. The method according to claim 15, wherein said isocyanate index is between about 80 and about 120.

20. The method according to claim 15, wherein said isocyanate index is between about 90 and about 115.

21. The method according to claim 15, wherein said blowing agent comprises water in an amount from about 1 to about 7 parts by weight per 100 parts of said polyol component (a).

22. The method according to claim 15, wherein said blowing agent comprises water in an amount from about 1 to about 5 parts by weight per 100 parts of said polyol component (a).

23. The method according to claim 15, wherein said liquid hydrocarbon is free of isocyanate reactive groups.

24. The method according to claim 15, wherein said blowing agent further includes at least one member selected from the group consisting of dichloromethane, difluorodichloromethane, 1,1-dichloro-1-fluoroethane, 1,1,2-trichloro-1,2,2-trifluoroethane, hydrofluorocarbons (HFC's), perfluorocarbons (PFC's), lower alkanes low molecular weight ethers and ketones, air and liquid $CO_2$ under pressure.

25. The method according to claim 15, wherein said liquid hydrocarbon comprises polybutadiene.

26. The method according to claim 25, wherein less than 65% of unsaturation in said polybutadiene is of 1,2 vinyl type.

27. The method according to claim 25, wherein less than 50% of unsaturation in said polybutadiene is of 1,2 vinyl type.

28. A method of reducing force to crush (FTC) of a high support (HS) or high support-high resilience (HS-HR) flexible polyurethane foam comprising combining
    a) a polyoxyalkylene polyol or polyoxyalkylene polyol blend having an average hydroxyl equivalent weight of at least about 1000 and an average primary hydroxyl content of at least about 25%,
    b) an effective amount of a blowing agent comprising water,
    c) from about 0.01 to about 0.5 parts by weight based on 100 parts by weight of said polyol component of a liquid hydrocarbon comprising greater than 50% of polymerized butadiene, and
reacting a), b) and c) in the presence of a catalyst with one or more di- or polyisocyanates at an index from about 70 to about 130, wherein the resulting high support (HS) or high support-high resilience (HS-HR) flexible polyurethane foam has a reduced force to crush (FTC).

29. The method according to claim 28, wherein said polyol component a) comprises a polyoxyalkylene polyol at least partially prepared in the presence of a double metal cyanide complex oxyalkylation catalyst.

30. The method according to claim 28, wherein said polyol polyoxyalkylene blend comprises at least one polyol comprising a polyoxyalkylene polyol at least partially prepared in the presence of a double metal cyanide complex oxyalkylation catalyst.

31. The method according to claim 28, wherein said polyol blend further includes one or more polyol polymer dispersions effective to provide a solids content of from about 3 weight percent to about 50 weight percent based on the weight of said polyol blend.

32. The method according to claim 28, wherein said isocyanate index is between about 80 and about 120.

33. The method according to claim 28, wherein said isocyanate index is between about 90 and about 115.

34. The method according to claim 28, wherein said blowing agent comprises water in an amount from about 1 to about 7 parts by weight per 100 parts of said polyol component (a).

35. The method according to claim 28, wherein said blowing agent comprises water in an amount from about 1 to about 5 parts by weight per 100 parts of said polyol component (a).

36. The method according to claim 28, wherein said liquid hydrocarbon is free of isocyanate reactive groups.

37. The method according to claim 28, wherein said liquid hydrocarbon comprises polybutadiene.

38. The method according to claim 37, wherein less than 65% of unsaturation in said polybutadiene is of 1,2 vinyl type.

39. The method according to claim 37, wherein less than 50% of unsaturation in said polybutadiene is of 1,2 vinyl type.

40. The method according to claim 28, wherein said blowing agent further includes at least one member selected from the group consisting of dichloromethane, difluorodichloromethane, 1,1-dichloro-1-fluoroethane, 1,1,2-trichloro-1,2,2-trifluoroethane, hydrofluorocarbons (HFC's), perfluorocarbons (PFC's), lower alkanes low molecular weight ethers and ketones, air and liquid $CO_2$ under pressure.

* * * * *